Figure 1:
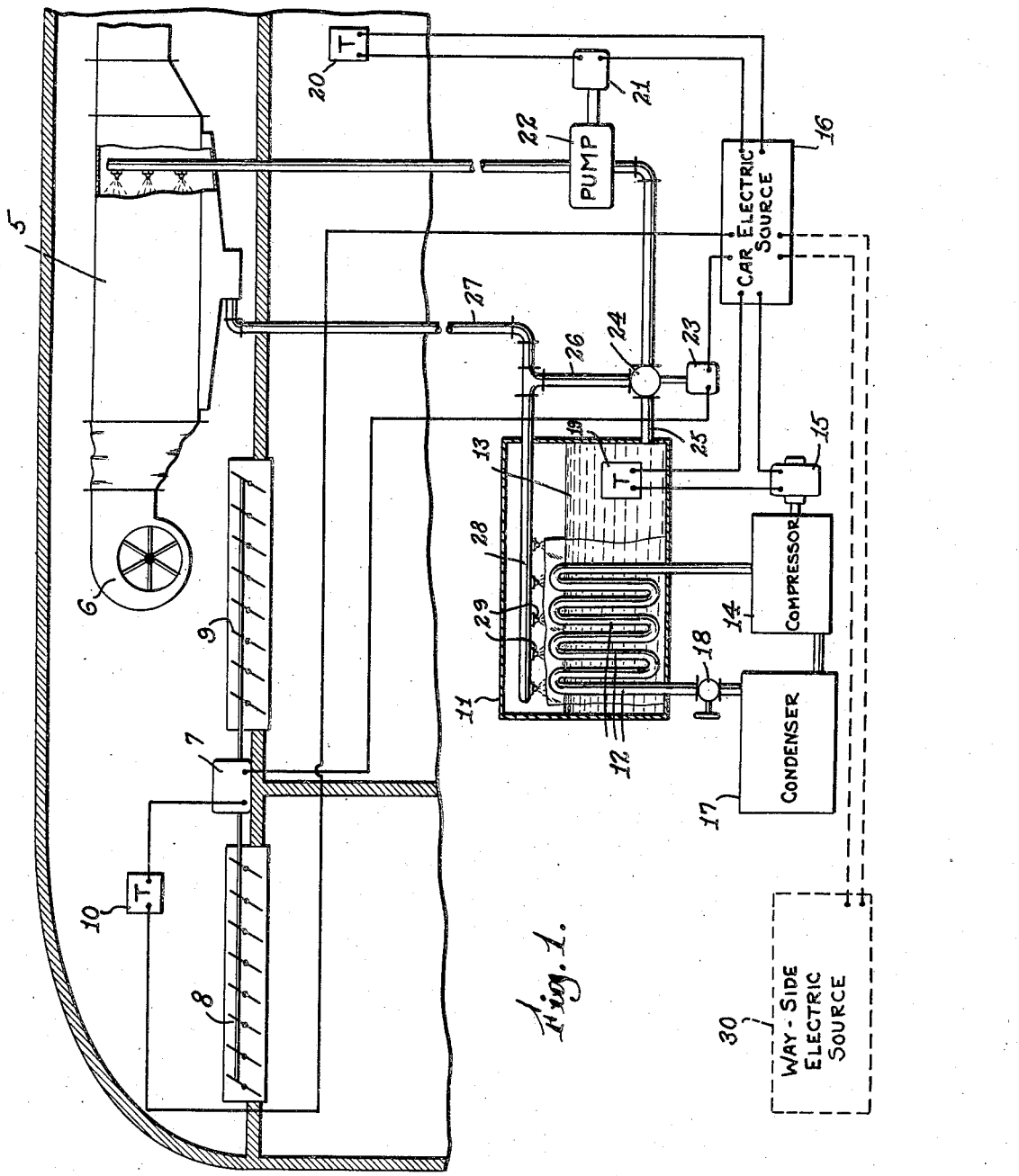

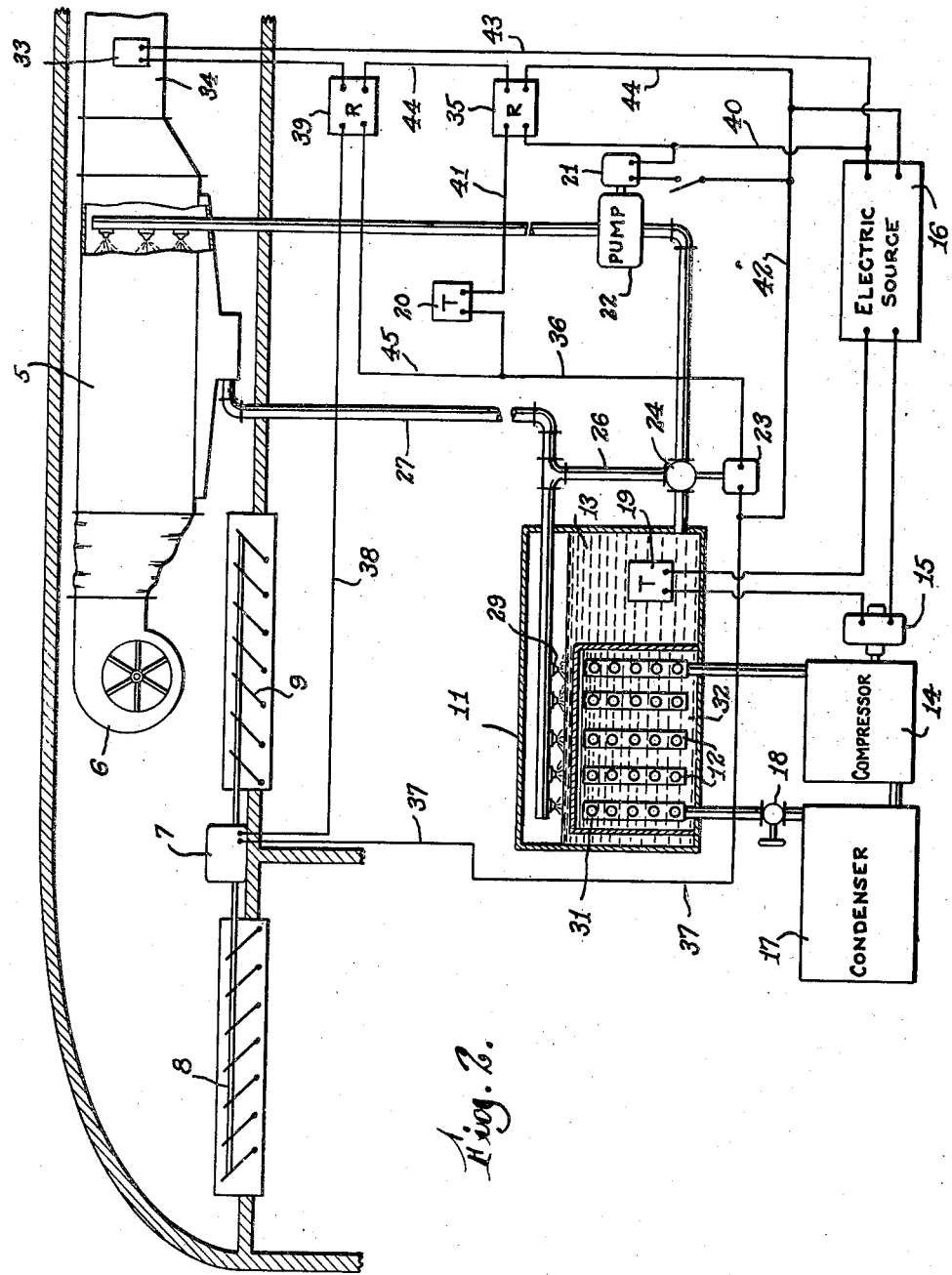

Patented May 30, 1939

2,160,389

UNITED STATES PATENT OFFICE 2,160,389

AIR CONDITIONING SYSTEM

Robert T. Palmer, Sharon, Mass., assignor to B. F. Sturtevant Company, Hyde Park, Boston, Mass.

Application January 12, 1938, Serial No. 184,614

8 Claims. (Cl. 62—117)

This invention relates to the cooling of air for comfort and relates more particularly to methods and apparatus for the cooling of air by evaporative cooling when effective and for the cooling of the air by refrigeration when evaporative cooling is ineffective.

It is the practice on railway passenger cars for example, to cool the air by passing it over finned coils through which ice water is forced or in which a volatile refrigerant is evaporated. The railroads generally prefer mechanical refrigeration systems in which a compressor or an electric generator for energizing a motor driven compressor, is driven from the car axle. The additional loads on the locomotive are heavy for it requires about 16 kilowatts of electric energy for air conditioning, for each car. Relatively large and expensive electric generators and compressors are required and they are in service on most runs but a small fraction of the time.

According to this invention, an air washer system combining evaporative cooling with cooling by refrigeration is provided. The system is operated in an evaporative cooling cycle when the wet bulb temperature of the outdoor air is low enough for evaporative cooling to be effective. A relatively small refrigerating plant is provided and it operates during the evaporative cooling cycle to create "stored cold" as by freezing water to make ice or by chilling an eutectic solution. When the condition of the air is such that evaporative cooling is no longer effective, the system is operated in a refrigerative cooling cycle by chilling the spray water with the "stored cold" provided during the evaporative cooling, and additionally by the action of the refrigerating plant.

It is believed that on most runs in hot weather, evaporative cooling may be effectively used at least 50% of the time. By operating the refrigerating plant during the evaporative cooling cycle to store "cold energy" which is used during the refrigerative cooling cycle, the refrigerating plant need not have more than one-half the capacity of the usual plant. This results in not only a much lower equipment cost but a greatly reduced operating cost. Another advantage is that through the use of an air washer, the air is more refreshing, is cleaner, and is free from the usual odors.

An object of the invention is to cool air at low cost.

Another object of the invention is to provide an inexpensive air conditioning system employing evaporative and refrigerative cooling.

Other objects of the invention will be apparent from the following description taken together with the drawings.

The invention will now be described with reference to the drawings of which Fig. 1 illustrates diagrammatically one embodiment of the invention adapted for installation on a railway passenger car, and Fig. 2 illustrates diagrammatically another embodiment of the invention adapted for installation on a railway passenger car.

With reference to Fig. 1, the air washer 5 is mounted in the roof zone of one end of a railway passenger car. The blowers 6 draw in outside and recirculated air, force it through the washer 5 and thence into the passenger space through any suitable duct or bulk-head discharge arrangement. The electric motor 7 adjusts the fresh air dampers 8 and the recirculated air dampers 9 to control the type of air supplied to the air washer. When the wet bulb temperature of the outdoor air is low enough for evaporative cooling to be effective, the thermostat 10 which may be set for example at a wet bulb temperature of 60° F., energizes the motor 7 to close the dampers 9 and open the dampers 8 so that only outdoor air enters the washer 5. For wet bulb temperatures above 60° F., the motor 7 is deenergized and permits both sets of dampers to return to partially open position.

The car has also the compartment 11 which contains the evaporator coils 12 in one end and the ice water sump 13 in the other end. The compressor 14 driven by the electric motor 15, which in turn is energized from the car electric source 16, compresses a volatile refrigerant such for example as "Freon". The compressed refrigerant is liquefied in the condenser 17 and is expanded in the valve 18 to evaporate in the coils 12. This evaporation of the refrigerant causes the water between the coils to freeze to form ice.

The thermostat 19 in the sump 13 disconnects the compressor motor 15 from the source 16 when the water in the sump 13 reaches a predetermined low temperature. Ice will form between the coils 12 before forming in the vicinity of the thermostat 19 and the temperature of the water in the sump is a measure of the quantity of ice formed within the compartment.

The thermostat 20 in the passenger space starts and stops the motor 21 for the water pump 22. The pump 22 when operating recirculates water through the washer 5 in an evaporative cooling cycle, or supplies ice water from the sump 13 to the washer 5 depending upon the condition of the out-door air as evidenced by the thermostat 10.

If the wet bulb temperature of the out-door air is at or below say 60° F., the thermostat 10 energizes the motor 7 to close the recirculated air dampers 9 and to open wide the fresh air dampers 8, and energizes the solenoid 23 to adjust the valve 24 to shut off the pipe 25 from the pump 22 and to open the by-pass pipe 26 causing water returned from the washer 5 through the pipe 27 to pass to the pump suction through the by-pass pipe 26. The system then operates in an evaporative cooling cycle with all out-door air passing through recirculated spray water.

During the evaporative cooling cycle, the compressor 14 operates continuously to make ice in the compartment 11. If the evaporative cooling cycle continues long enough, eventually sufficient ice will be formed in the compartment and the thermostat 19 will shut down the compressor.

When the wet bulb temperature of the outdoor air rises above 60° F., the thermostat 10 acts to cause the motor 7 to partially close the fresh air dampers 8 and to partially open the recirculated air dampers 9, and also acts to cause the solenoid 23 to close off the by-pass pipe 26 and open the pipe 25. This latter causes the pump 22 to draw ice water from the compartment 11 and causes the water returned through the pipe 27 from the washer 5 to pass through the pipe 28 and to be sprayed through the nozzles 29 upon the ice formed between the evaporator coils. The system then operates in a refrigerative cooling cycle.

During the refrigerative cooling cycle, cooling of the spray water is effected by the direct action of the evaporator coils 12 as well as by the melting of the ice formed during the evaporative cooling cycle. Thus, the compressor is enabled to handle a load much greater than it could handle were it operated as is usual, only during refrigerative cooling.

If it is expected that weather or other conditions will be such that the system may be required to start off in a refrigerative cooling cycle, the compressor motor 15 may be energized from the way-side source to cause the formation of the ice in the compartment 11 prior to placing the car into service. Likewise way-side refrigeration facilities could be utilized to supply ice for the compartment 11 if this were desired.

In the embodiment illustrated by Fig. 2, the system and apparatus are the same as those previously described except in two particulars. One difference is that instead of the evaporator coils 12 being directly in contact with the spray water in the sump 13, they are enclosed within the compartment 31 in a brine or eutectic solution, the spray water being cooled by contact with the outer surface of the compartment 31.

The other difference between the embodiment of Fig. 1 and that of Fig. 2, is that the wet bulb thermostat 10 of Fig. 1 is not used in the embodiment of Fig. 2 and instead a dry bulb thermostat 33 located in the air duct 34 serves to control the adjustment of the dampers 8 and 9, and the car thermostat 20 instead of starting and stopping the pump 22, closes and opens the by-pass around the by-pass pipe 26.

The control system of Fig. 2 is designed to permit the sprays in the air washer to be continuously projected. The thermostat 20 in the passenger space operates to open the by-pass and to adjust the dampers for all outdoor air when the air in the passenger space has been cooled to the desired degree. The system is then in condition for evaporative cooling. If the wet bulb temperature of the outdoor air is low enough for evaporative cooling to be effective, the outdoor dampers remain open and the recirculated air dampers remain closed. If, however, the wet bulb temperature of the outdoor air is too high for evaporative cooling to be effective, the air leaving the washer is too warm and effects the duct thermostat 33 which acts to adjust the dampers to 25% outdoor and 75% recirculated air.

The system thus acts in a refrigerative cooling cycle when the indoor temperature is too high and operates in an evaporative cooling cycle, wherever possible, to prevent the car temperature from rising above the desired point.

The thermostat 20 controls the energization of the solenoid 23 through a series circuit including the wire 41, the winding of the relay 35, the wire 40, the electric source 16, the wire 42, the winding of the solenoid 23 and the wire 36. The damper motor 7 is connected in series through the wire 38 with the contacts of the relay 39 and by the wires 37 and 45, the solenoid 23 and wire 36 to the thermostat 20 so that the damper motor is energized when the solenoid 23 is energized providing the contacts of the relay 39 are closed.

The dry bulb thermostat 33 is mounted at the output side of the washer 5, in the duct 34. It responds to the temperature of the air leaving the washer and acts as a wet bulb control. When 100% outdoor air is supplied to the washer 5 and the water to the washer is recirculated with the by-pass through the pipe 16 open, the dry bulb temperature of the air passing the thermostat 33 closely approximates the wet bulb temperature of the outdoor air.

The thermostat 33 is connected in series in the electric circuit including the winding of the relay 39, the wire 44, the contacts of the relay 35, the electric source 16 and the wire 43.

When the system is first started up, assuming it is too warm in the car, the contacts of the thermostat 20 are open and the relay 35, the motor 7 and the solenoid 23 are deenergized. The relay 35 is adapted to open its contacts when it is deenergized so that the relay 39 and the thermostat 33 are disconnected from the electric source 16. The relay 39 is adapted to close its contacts when deenergized so that the circuit including the motor 7 and the thermostat 20 is closed when the relay 39 is deenergized. The thermostat 33 and relay 39 cannot function so long as the temperature in the car is above the point at which the thermostat 20 operates, which point may, for example, be 74° F. The damper motor 7 when deenergized holds the dampers 8 and 9 to a position of 75% recirculated and 25% outdoor air. The solenoid 23 when deenergized holds the valve 24 in a position to maintain the by-pass pipe 26 closed. The system thus operates in a refrigerative cooling cycle until the car is cooled to 74° F.

When the car is cooled to 74° F., the contacts of the thermostat 20 close and the relay 35, the motor 7 and the solenoid are energized. The motor 7 adjusts the dampers 8 and 9 to 100% outdoor air. The solenoid 23 opens the by-pass pipe 26. The system is then in condition for evaporative cooling and will operate in an evaporative cooling cycle if the wet bulb temperature of the outdoor air is low enough.

The energization of the relay 35 causes it to close its contacts to connect the winding of the relay 39 and the thermostat 33 to the electric source 16. The relay 39 since it is in series with the thermostat 33 cannot become energized until the contacts of the thermostat 33 close. The thermostat 33 is adapted to close its contacts at temperatures above say 62° F. to which temperature the air leaving the washer should be cooled a short time after the dampers are set for 100% outdoor air and the spray water is recirculated. The relay 35 may be of the time delay type such for example as is described on pages 413–417 of "Relay Handbook" published in 1926 by the National Electric Light Association.

If the air passing the thermostat 33 is not cooled to 60° F., it closes its contacts and energizes the relay 39 which then opens its contacts and disconnects the motor 7 from the electric source. The motor 7 is then deenergized and adjusts the dampers 8 and 9 to 75% recirculated and 25% outdoor air.

If the wet bulb temperature of the outdoor air drops to 60° F. while the spray water is recirculated, the thermostat 33 becomes deenergized and the relay 39 is deenergized and its contacts close to again connect the motor 7 to the electric source.

If the recirculation of the spray water is insufficient to maintain the desired indoor temperature, the thermostat 20 again becomes deenergized by the rise in temperature and the dampers are again set for mixed recirculated and outdoor air and the by-pass pipe 26 is again closed.

While several embodiments of the invention have been described for the purpose of illustration, it should be understood that the invention is not limited to the apparatus and arrangements of apparatus described as departures therefrom may be suggested by those skilled in the art without departing from the spirit of the invention.

What is claimed is:

1. The method in air conditioning which comprises cooling outdoor air in an evaporative cooling cycle at all wet bulb temperatures of the outdoor air below a predetermined point, making ice during the evaporative cooling cycle, and removing heat from the air with the ice when the wet bulb temperature of the outdoor air is above said predetermined point.

2. The method in conditioning the outdoor air to be supplied to an enclosure which comprises spraying water into the air to cool same in an evaporative cooling cycle at all wet bulb temperatures of the outdoor air below a predetermined point, discharging the air so cooled, substantially unchanged in temperature into said enclosure, chilling other water during said evaporative cooling cycle, and cooling the spray water with said other water when the wet bulb temperature of the outdoor air is above said predetermined point.

3. The method in conditioning the outdoor air to be supplied to an enclosure which comprises spraying water into the air to cool same in an evaporative cooling cycle at all wet bulb temperatures of the outdoor air below a predetermined point, discharging the air so cooled, substantially unchanged in temperature into said enclosure, making ice during said evaporative cooling cycle, and cooling the spray water with the ice when the wet bulb temperature of the outdoor air is above said predetermined point.

4. The method in conditioning the outdoor air to be supplied to an enclosure which comprises spraying water into the air to cool same in an evaporative cooling cycle at all wet bulb temperatures of the outdoor air below a predetermined point, discharging the air so cooled, substantially unchanged in temperature into said enclosure, freezing water to make ice through the evaporation of a volatile refrigerant during said evaporative cooling cycle, and cooling the spray water with the ice when the wet bulb temperature of the outdoor air is above said predetermined point.

5. The method in conditioning the outdoor air to be supplied into an enclosure which comprises spraying water into the air to cool same in an evaporative cooling cycle at all wet bulb temperatures of the outdoor air below a predetermined point, discharging the air so cooled, substantially unchanged in temperature into said enclosure, chilling a liquid through the evaporation of a volatile refrigerant during said evaporative cooling cycle, and cooling the spray water with said liquid and through the evaporation of said refrigerant when the wet bulb temperature of the outdoor air is above said predetermined point.

6. Air conditioning apparatus for a passenger vehicle, comprising in combination, an air washer, refrigerating means carried by said vehicle for compressing and condensing a volatile refrigerant, a compartment containing water, a second compartment containing an eutectic solution, immersed in the water in said compartment, means for chilling the solution in said second compartment through the evaporation of said refrigerant, means for flowing water in a circuit including said washer and said first mentioned compartment, means forming a by-pass around said first mentioned compartment in said circuit, and means for opening said by-pass when the wet bulb temperature of the air is low enough for evaporative cooling to be effective.

7. Air conditioning apparatus comprising in combination, an air washer, a source of refrigerated water connected to said air washer, means connected to said washer and to said source and forming a by-pass around said source for the water returned from said washer, means for providing outdoor and recirculated air to said washer, a first indoor thermostat, means connected to said thermostat and to said by-pass and to said second mentioned means and controlled by said thermostat for routing the water from said washer through said by-pass and for adjusting said second mentioned means for increasing the proportion of outdoor air when the indoor temperature is below a predetermined point or for routing the water from said washer through said source and for adjusting said second mentioned means for increasing the proportion of recirculated air when the indoor temperature is above said point, a second thermostat exposed to the air from said washer, means connecting said second thermostat and said second mentioned means for adjusting said second mentioned means, and means for controlling said second thermostat by said first thermostat.

8. Air conditioning apparatus comprising in combination, an air washer, a source of refrigerated water connected to said air washer, means connected to said washer and to said source and forming a by-pass around said source for the water returned from said washer, means for providing outdoor and recirculated air to said washer, a first indoor thermostat, means connected to said thermostat and to said by-pass and to said second mentioned means and controlled by said thermostat for routing the water from said washer through said by-pass and for adjusting said second mentioned means for increasing the proportion of outdoor air when the indoor temperature is below a predetermined point or for routing the water from said washer through said source and for adjusting said second mentioned means for increasing the proportion of recirculated air when the indoor temperature is above said point, a second thermostat exposed to the air from said washer, means connecting said second thermostat and said second mentioned means for adjusting said second mentioned means, and means controlled by said first thermostat for disconnecting said second thermostat from said second mentioned means when the indoor temperature is below said predetermined point.

ROBERT T. PALMER.